United States Patent
Ottur et al.

(10) Patent No.: US 8,483,210 B2
(45) Date of Patent: Jul. 9, 2013

(54) METHOD AND APPARATUS FOR VOICE TRAFFIC MANAGEMENT IN A DATA NETWORK

(75) Inventors: Deepak Ottur, Hillsborough, NJ (US);
Daniel T. Smires, Freehold, NJ (US);
John Riley, Topsfield, MA (US); Louis Mamakos, Lawrenceville, NJ (US);
Mary Grikas, Colts Neck, NJ (US);
Kevin Ma, North Brunswick, NJ (US)

(73) Assignee: Vonage Network LLC, Holmdel, NJ (US)

( * ) Notice: Subject to any disclaimer, the term of this patent is extended or adjusted under 35 U.S.C. 154(b) by 988 days.

(21) Appl. No.: 12/322,141

(22) Filed: Jan. 28, 2009

(65) Prior Publication Data
US 2010/0189095 A1 Jul. 29, 2010
US 2012/0300767 A9 Nov. 29, 2012

Related U.S. Application Data

(60) Provisional application No. 61/062,615, filed on Jan. 28, 2008.

(51) Int. Cl.
*H04L 12/66* (2006.01)

(52) U.S. Cl.
USPC ............ 370/352; 370/230; 370/468; 709/226

(58) Field of Classification Search
None
See application file for complete search history.

(56) References Cited

U.S. PATENT DOCUMENTS

| | | |
|---|---|---|
| 6,967,921 B1 | 11/2005 | Levy et al. |
| 7,065,048 B1 | 6/2006 | Levy et al. |
| 2002/0087711 A1 | 7/2002 | Leung |
| 2003/0229714 A1 | 12/2003 | Kiremidjian et al. |
| 2007/0025249 A1 | 2/2007 | Yeom |
| 2007/0061433 A1 | 3/2007 | Reynolds et al. |
| 2007/0147247 A1 | 6/2007 | Kalonji et al. |
| 2007/0201446 A1* | 8/2007 | Wright .......................... 370/356 |
| 2008/0165685 A1 | 7/2008 | Weiss et al. |
| 2008/0225709 A1 | 9/2008 | Lange |

(Continued)

FOREIGN PATENT DOCUMENTS

WO  WO 00/48366 A1  8/2000

OTHER PUBLICATIONS

Internet Engineering Task Force RFC3261, "SIP: Session Initiation Protocol", J. Rosenberg et al., Jun. 2002.

(Continued)

*Primary Examiner* — Chi Pham
*Assistant Examiner* — Mohammad Adhami
(74) *Attorney, Agent, or Firm* — Moser Taboada; Joseph Pagnotta

(57) ABSTRACT

Method and apparatus for voice traffic management in a data network includes establishing a default maximum bandwidth setting at a LAN egress port when voice-type traffic is not present in a LAN portion of the data network, detecting voice-type traffic, reducing the bandwidth setting at the LAN egress port to effect a change in a rate of non voice type traffic and monitoring non voice type traffic and voice quality statistics to determine if the rate of non voice type traffic entering the data network has changed. Once the desired change has occurred, performing a linear increase of the bandwidth setting at the LAN egress port to a first value while monitoring voice quality statistics, determining if voice quality has degraded during increase of the bandwidth setting and repeating the last two steps if voice quality has not degraded.

22 Claims, 7 Drawing Sheets

U.S. PATENT DOCUMENTS

| | | | |
|---|---|---|---|
| 2008/0298237 | A1 | 12/2008 | Dos Remedios et al. |
| 2009/0028161 | A1 | 1/2009 | Fullarton et al. |
| 2009/0029777 | A1 | 1/2009 | Holt et al. |
| 2009/0046706 | A1 | 2/2009 | Chernow |
| 2009/0089849 | A1* | 4/2009 | Jefremov .................. 725/118 |
| 2009/0141631 | A1* | 6/2009 | Kim et al. .................. 370/235 |

OTHER PUBLICATIONS

Internet Engineering Task Force RFC3550, "RTP: A Transport Protocol for Real-Time Applications", H. Schulzrinne et al., Jul. 2003.

Internet Engineering Task Force RFC4566, "SDP: Session Description Protocol", M. Handlely et al., Jul. 2006.

Karam, M. J. "Analysis of the delay and jitter of voice traffic over the Internet" In: INFOCOM 2001. 20th Annual Joint Conference of the IEEE, (See PCT Search Report).

PCT Search Report for International Application No. PCT/US2009/000580, mailed Sep. 14, 2009.

* cited by examiner

Fig. 1 – Prior Art

METHOD AND APPARATUS FOR VOICE TRAFFIC MANAGEMENT IN A DATA NETWORK This patent application claims the benefit of U.S. Provisional Patent Application No. 61/062,615 filed Jan. 28, 2008.

FIELD OF THE INVENTION

The invention is related to the field of telecommunication devices and services and more specifically, the invention is directed to an apparatus and method that prioritizes and improves the flow of voice traffic in certain portions of a data network that also functions, in part, as a telecommunication system utilizing Voice over Internet Protocol (VoIP).

BACKGROUND OF THE INVENTION

VoIP is a technological development in the field of telecommunications that is utilized to transmit voice conversations over a data network using Internet Protocol (IP) packets rather than the existing and traditional telecommunications system more commonly referred to as the Public Switched Telephone Network (PSTN) or Plain Old Telephone Service (POTS). Entities (e.g., businesses or individuals) implement VoIP by purchasing and installing the necessary equipment (e.g., one or more Customer Premise Equipment (CPE) devices) to access a VoIP service provider and activating this telecommunication service via a broadband Internet connection.

Typically, entities will not have solely telecommunications equipment connected to the broadband Internet connection. Various other data networking devices including but not limited to computers, peripherals and wireless networking devices will comprise a substantial Local Area Network (LAN) that is connected to a Wide Area Network (WAN) with a multitude of services available via the broadband Internet connection. With the growing amount video and rich content (iTunes, You-Tube etc.) being available on the Internet, entities are increasingly downloading large files, which has the potential to saturate a broadband Internet connection in the downstream direction (i.e., towards the LAN). P2P applications like Bit-Torrent are also starting to inundate broadband Internet connections in both directions. Some VoIP equipment have upstream Quality of Service (QoS) capabilities which prioritize voice-type traffic ahead of other application traffic, thereby ensuring high voice quality towards the remote party (towards the WAN). However, QoS capabilities are limited in the downstream direction, which causes VoIP customers to experience poor voice quality when someone on their LAN (i.e., a home network) starts a large download.

FIG. 1 is a system level diagram depicting a prior art data network 100 that also functions, in part, as a telecommunication system based on VoIP. The data network 100 includes various components such as cable modem termination system (CMTS), a DSLAM or other edge router/switch such as a Metro Ethernet router 112 used to provide high speed data services via an integrated data network 114 (e.g., the Internet) between various devices. Such devices include servers 116, customer networks 105 connected via a cable modem 102 and POTS devices 124 connected by the PSTN 122, telephony gateway(s) 120 and media relay(s) 118. A customer network 105 may be further defined by a VoIP telephony adapter 104 that connects to one or more telephony devices 106 and also functions as a router to create Ethernet based connections 108 to other customer equipment such as a laptop computer 110 (via wired or wireless protocols known to those skilled in the art). For the purposes of this discussion, connections and components behind the VoIP telephony adapter 104 define a LAN 101 while connection and components in front of the VoIP telephony adapter 104 define a WAN 103.

The downstream bandwidth between the server 116 and a CMTS 112 is typically higher than that of the customer's broadband link. Therefore, when the customer starts a download 123, typically with a Transmission Control Protocol/Internet Protocol (TCP/IP)—based protocol, TCP rate control quickly ratchets up the downstream bandwidth utilization to the level of the lowest bandwidth link in the chain, which is usually the customer's broadband link. If, during this download, a voice communication session 121 occurs, there is packet queuing (delay & jitter) and packet drops 113 at the CMTS 112 in the downstream direction, both of which contribute to poor voice quality. The upstream bandwidth is usually not severely affected, since TCP ACK packets in the upstream direction are of very small size (typically less than 50 bytes), and fewer in number than downstream TCP packets.

Accordingly, there is a need in the art for an apparatus and method for providing voice traffic management in a data network to improve the overall experience of VoIP telephony.

SUMMARY OF THE INVENTION

The disadvantages associated with the prior art are overcome by a method and apparatus of voice traffic management in a data network that functions in part as a telecommunication system based on VoIP. The data network has a wide area network (WAN) portion and a local area network (LAN) portion. In one embodiment, the method includes the steps of establishing a default maximum bandwidth setting at a LAN egress port when voice-type traffic is not present in the LAN portion of the data network, detecting voice-type traffic in the LAN portion of the data network, reducing the bandwidth setting at the LAN egress port to effect a change in a rate of non voice type traffic entering the LAN portion of the data network and monitoring non voice type traffic and voice quality statistics to determine if the rate of non voice type traffic entering the LAN portion of the data network has changed. Once the desired change has occurred, the method continues by performing a linear increase of the bandwidth setting at the LAN egress port to a first value while monitoring voice quality statistics, determining if voice quality has degraded during increase of the bandwidth setting and repeating the last two steps if voice quality has not degraded. Preferably, the bandwidth setting at the LAN egress port is set to a second value that is less than the first value.

The method further includes the steps of upon detection of termination of the voice-type traffic in the LAN portion of the data network, setting the bandwidth setting to the default maximum value and upon detection of new voice-type traffic in the LAN portion of the data network, setting the bandwidth setting to a fraction of the second value. Preferably, the fraction of the second value is approximately 70%. The maximum value is determined by one selected from the group consisting of a measurement of the downstream bandwidth of the broadband link associated with the data network and a sum of the second value and the bandwidth used by the voice-type traffic. The detection of voice-type traffic in the LAN portion of the data network is achieved by one selected from the group consisting of determining completion of SIP/SDP codec negotiation and determining the sending or receiving of a SIP INVITE message associated with the voice-type traffic in the LAN portion of the data network. The bandwidth setting is only reduced with respect to non-voice type traffic in the LAN portion of the data network that effects voice quality. Further, parts of the presented method can be performed two or more times consecutively to account for two or more instances of new voice-type traffic in the LAN portion of the data network.

BRIEF DESCRIPTION OF THE FIGURES

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

To achieve the desired objectives, the subject invention provides IP-based telecommunication services (i.e., VoIP) subscribers with the ability to dynamically control the bandwidth of data entering a LAN portion of a larger data network to improve voice communications therein. Real-time management and control are executed by an apparatus and method in an IP-based environment (i.e., the Internet). In a preferred embodiment of the invention, the voice traffic management functions operate as part of a larger VoIP telecommunication service. Such telecommunication service is, by way of example, part of any public or private data network (or combination thereof) constructed for (in part) and adapted to convert analog voice signals (e.g., generated by a human utterance) to a digitized and packetized format according to known and understood protocols (such as but not limited to Transmission Control Protocol/Internet Protocol (TCP/IP)) for transmission from an originating point (Party A) to one or more terminating points (Party B and/or C, D and the like). In a preferred embodiment of the invention, the data network is an IP-based network such as (but not limited to) the Internet having VoIP specific and related components connected thereto.

Figure 1:
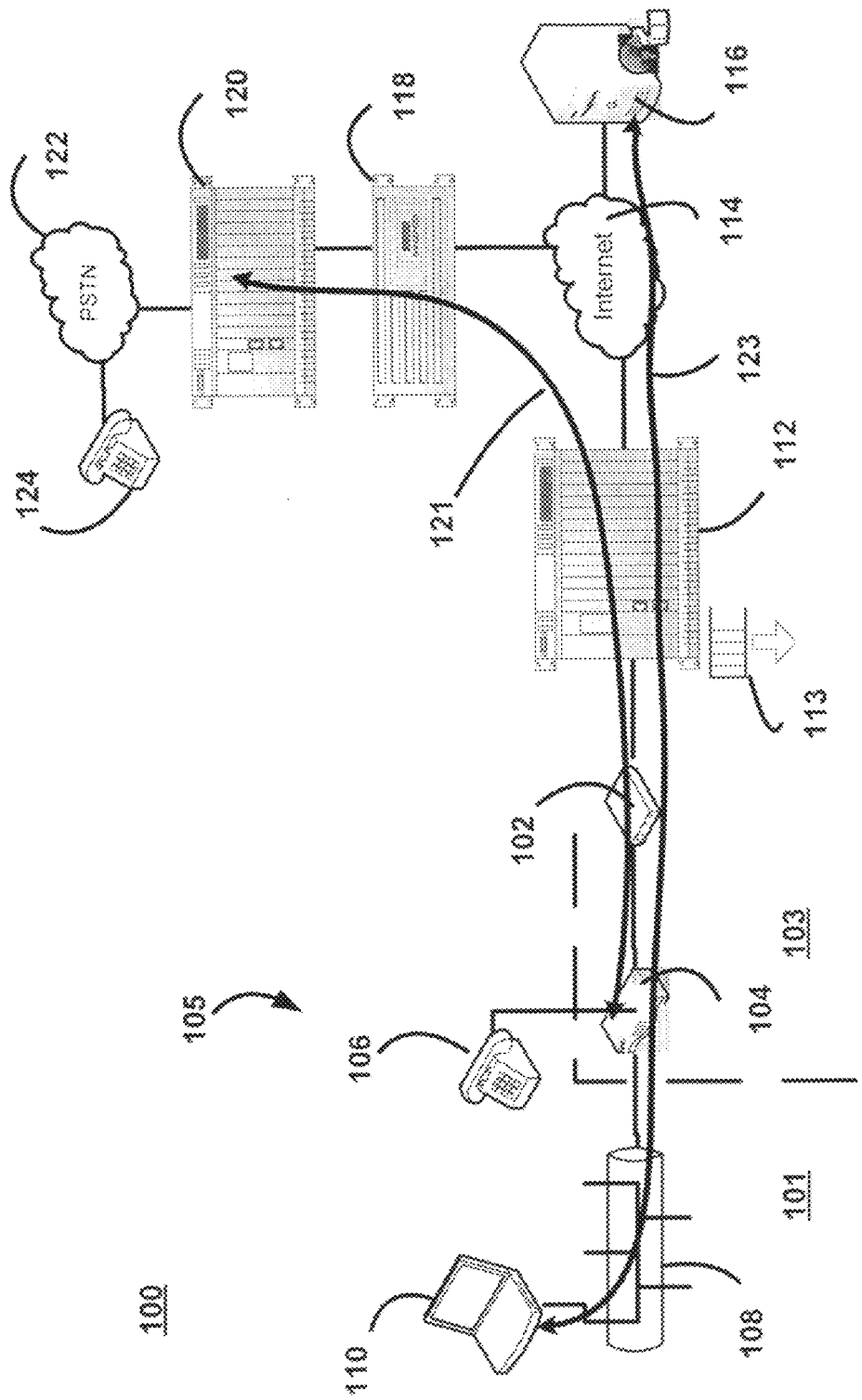
FIG. 1 is a system level diagram depicting a prior art data network that also functions, in part, as a telecommunication system based on VoIP.
Figure 2:
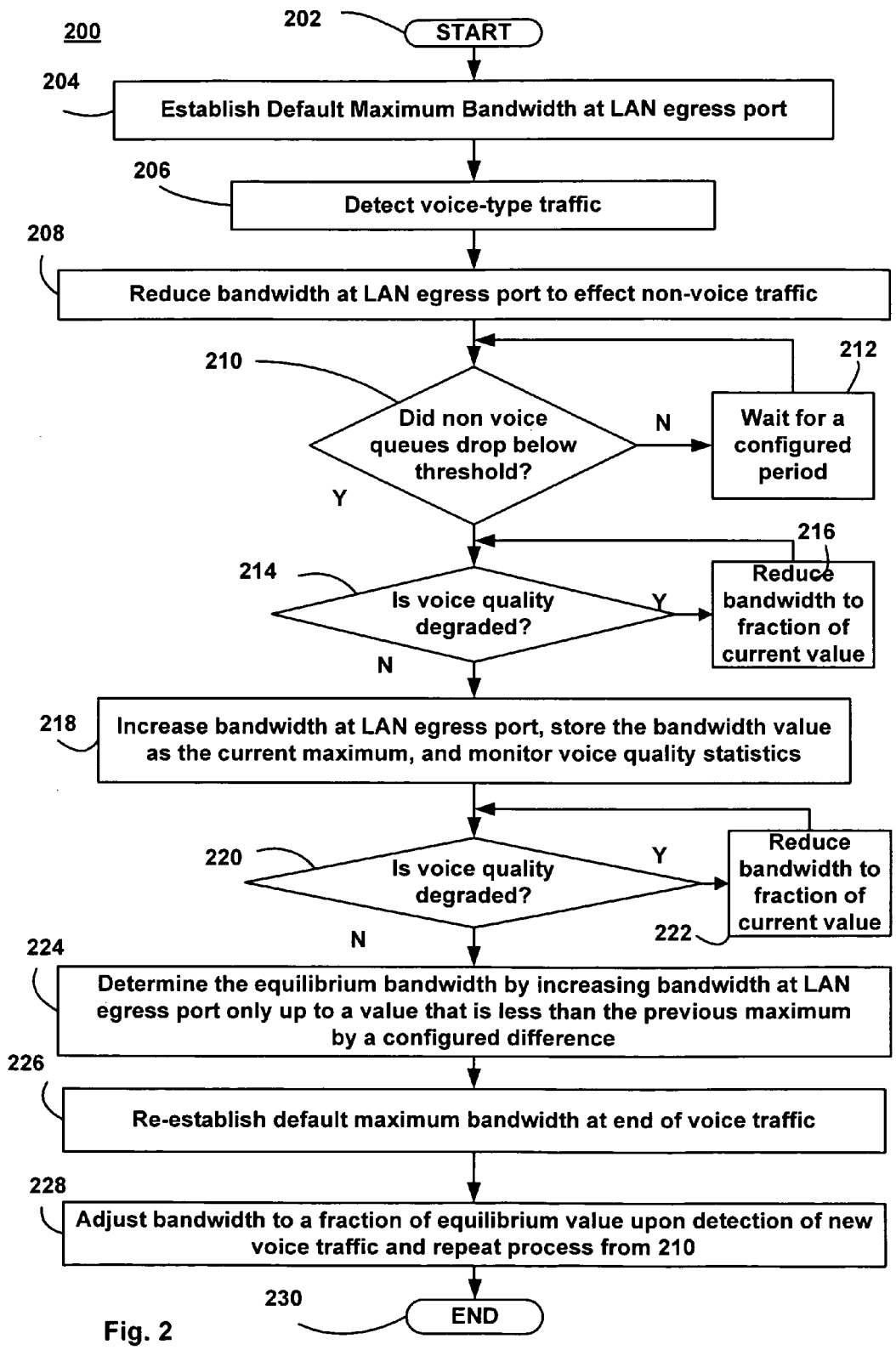
FIG. 2 is a flowchart depicting a method of voice traffic management in a data network that also functions, in part, as a telecommunication system based on VoIP in accordance with the subject invention.

FIG. 2 depicts a series of method steps 200 for performing voice traffic management in a data network that also functions, in part, as a telecommunication system based on VoIP in accordance with the subject invention. The method is, in one embodiment of the invention, practiced by a telephone adapter described in greater detail below with respect to the data network and its interconnected components. The voice traffic management method 200 starts at step 202 and proceeds to step 204 where a default maximum bandwidth is established at a LAN egress port associated with a LAN portion of a data network. Preferably and in one embodiment of the invention, the default maximum bandwidth is the bandwidth of the broadband link available in a WAN portion of the data network as would typically be provided by a broadband Internet service provider. In one example, such default maximum bandwidth is either configured or determined by other means as described in greater detail below. In one example, such default maximum bandwidth is configured to be 20 Mbps. Note that this default maximum bandwidth is established at the LAN egress port of the telephone adapter when such telephone adapter is not handling any active telephone calls.

At step 206, new voice-type traffic is detected in the data network. Voice-type traffic is further defined by, but not necessarily limited to, signaling information used to establish a voice communication session and the actual media stream that carries the content of the voice communication. In one embodiment of the invention, an example of the signaling information is selected from the group consisting of Session Initiation Protocol (SIP) messages and Session Description Protocol (SDP) parameters. SIP is a packed network based communications protocol that is used to establish, tear down and provide additional features and functionality to VoIP telephony. The details and functionality of SIP can be found in the Internet Engineering Task Force (IETF) Request for Comments Paper No. 3261 herein incorporated in its entirety by reference. SDP is a format for describing streaming media initialization parameters in an ASCII string. The details and functionality of SDP can be found in the IETF Proposed Standard as RFC 4566 herein incorporated in its entirety by reference. In one embodiment of the invention, an example of the media stream is the Real-time Transport Protocol (RTP) which defines a standardized packet format for delivering audio and video over the Internet. RTP is frequently used in streaming media systems as well as in videoconferencing and push to talk systems. For these it carries media streams controlled by H.323 or SIP signaling protocols, making it the technical foundation of the Voice over IP industry. The details and functionality of RTP can be found in IETF RFC 3550 herein incorporated in its entirety by reference. In one embodiment of the invention, detection of voice-type traffic is determined by completion of SIP/SDP codec negotiation, but other detection triggers are possible to those skilled in the art of VoIP telephony.

At step 208, the bandwidth at the LAN egress port associated with a LAN portion of a data network is significantly reduced from its previously established default value. The purpose of this bandwidth reduction is to affect the rate of non-voice data that is coextensively traveling from the WAN portion of the data network to the LAN portion of the data network when a new voice communication is being attempted. Preferably and in one embodiment of the invention, the reduced bandwidth is approximately 150 kbps. This reduced bandwidth value however is configurable and one skilled in the art can arrive at a suitable value alternate values which are also within the scope of the invention to achieve the necessary bandwidth reduction. This reduction in bandwidth severely throttles user application traffic that is not part of the voice communication. For example, scheduling of network traffic in the LAN 101 is implemented by a weighted fair queuing (WFQ) algorithm between a plurality of queues as described in greater detail below with respect to FIG. 6. If a file download (as part of said network traffic) was in progress, this will immediately result in queuing of downstream packets from the WAN portion of the data network to the LAN portion of the data network, which delays their arrival at the user's computer. This consequently results in delayed Transmission Control Protocol (TCP) messaging (i.e., ACK's) sent back to a server on the Internet, which causes TCP rate control to scale back the bandwidth utilization. TCP is a well-known and established protocol that provides reliable, ordered delivery of a stream of bytes from one program on one computer to another program on another computer. If a LAN egress queue fills up and causes packet discards, this triggers a TCP congestion back-off mechanism causing exponential drop of the TCP rate.

In one embodiment of the invention, such reduction occurs subsequent to completion of SIP/SDP codec negotiation but prior to establishment of the RTP session that characterizes the new voice communication. This allows the rate limiting to take effect a few hundred ms earlier, thereby reducing the effect of the downstream traffic on the voice quality at the beginning of the call. In an alternate embodiment of the invention, the bandwidth reduction occurs immediately upon sending or receiving a SIP INVITE, which provides additional time for the method to achieve convergence. In another alternate embodiment of the invention, the bandwidth reduction occurs in a selective rather than universal manner. That is, in the first two embodiments, the bandwidth is reduced without regard to the specific downstream data traffic that is entering the LAN portion of the data network (i.e., any number of file downloads, web pages and other activity). In the selective alternate embodiment, the active download stream(s) that is(are) responsible for reducing voice quality are identified and limited thereby leaving other low-usage open TCP streams alone. This will improve the user experience for the other applications, while only affecting the offending applications. For example, the active download stream(s) that have a significant impact on voice quality are identified by tracking the state of each active TCP session, and maintaining downstream bandwidth utilization statistics for each TCP session. The session(s) that have high bandwidth utilizations will have the most impact on downstream voice quality, and these are selectively limited while leaving those session(s) with low bandwidth utilizations unimpacted.

At step 210, a decision is executed as to whether non-voice traffic has dropped below a desired threshold. That is, non-voice traffic queuing is monitored to determine if the reduction in bandwidth at the LAN egress port has had any effect. The amount of non-voice traffic is compared to a Queue Threshold Factor (QTF, a previously established value). If the non-voice traffic is not below the QTF, the method 200 proceeds to step 212 where a waiting period is invoked or otherwise determined to be in effect to allow the non-voice traffic an opportunity to fall below the QTF. The method 200 then loops back to repeat step 210 until non-voice traffic is at or below the QTF.

At step 214, a decision is executed as to whether the quality of the voice communication session has degraded as a result of the bandwidth reduction of step 208 and non-voice traffic volume. If the voice communication session quality has degraded, the method 200 proceeds to step 216 where the bandwidth is further reduced to a fraction of the current value (as set forth in step 208). The method 200 then loops back to repeat step 214 until voice communication session quality has not degraded wherein, the method 200 proceeds to step 218.

At step 218, the bandwidth at the LAN egress port is increased as voice communication quality statistics are monitored. More specifically, once the TCP rate of the non-voice traffic in the data network is scaled back, the telephone adapter allows for an increase in non-voice traffic entering the LAN portion of the data network. Preferably, this increase is linear in profile with a slope characteristic that is configurable. In one example of the invention, the slope is configured to be 10 kbps per second. The bandwidth is increased until a first value is reached. Such first value is defined and explained in greater detail below with respect to a LAN Egress Manager Module 632 in one embodiment of the invention. While the increase is being performed, RTCP statistics for the incoming stream(s) (i.e., voice communication session(s)) are monitored.

At step 220, a decision is executed as to whether the quality of the voice communication session has degraded as a result of the increase in bandwidth associated with step 218. Specifically, if the RTCP statistics indicate an increase in packet drops, jitter (packet discards), delay or MOS score, then the method proceeds to step 222 to reduce the bandwidth at the LAN egress port. In one embodiment of the invention, the reduction occurs in an exponential manner to a fraction of its current value, though other response profiles are possible and known to those skilled in the art. The method then once again proceeds to step 218 to linearly increase the bandwidth at the LAN egress port. However, the bandwidth is now increased only up to a value that is less than the first value (where RTCP statistics indicated a previous drop in voice quality) and the method re-enters step 220 to perform voice communication quality analysis.

If no degradation in voice quality is determined by the decision of step 220, then the proceeds to step 224 wherein a second value is determined. This second value is determined and then defined as the bandwidth "equilibrium" value. Such second value is stored in memory for future voice-type traffic processing scenarios as described in greater detail below.

When the voice communication ends at step 226, the default maximum bandwidth is re-established as it is approximately the maximum value of the downstream bandwidth of the broadband link. Performing this step allows the LAN portion of the network to receive data as it normally would, unimpeded by voice-type traffic override protocols as described in the subject method. This maximum value is either determined through downstream bandwidth measurement, or estimated based on the equilibrium value and the bandwidth used by the voice-type traffic.

At step 228, the bandwidth at the LAN egress port is once again adjusted upon the detection of one or more subsequent voice communication sessions. In a preferred embodiment of the invention, when the downstream RTP session is established for the subsequent voice communication session(s), the bandwidth at the LAN egress port is adjusted to a value which is a fraction of the equilibrium/second value. This fraction is fine tuned to allow the telephone adapter to quickly converge to the equilibrium value. In one embodiment of the invention, the fraction is a configurable value and preferably set at 70% The method ends at step 230.

Figure 3:
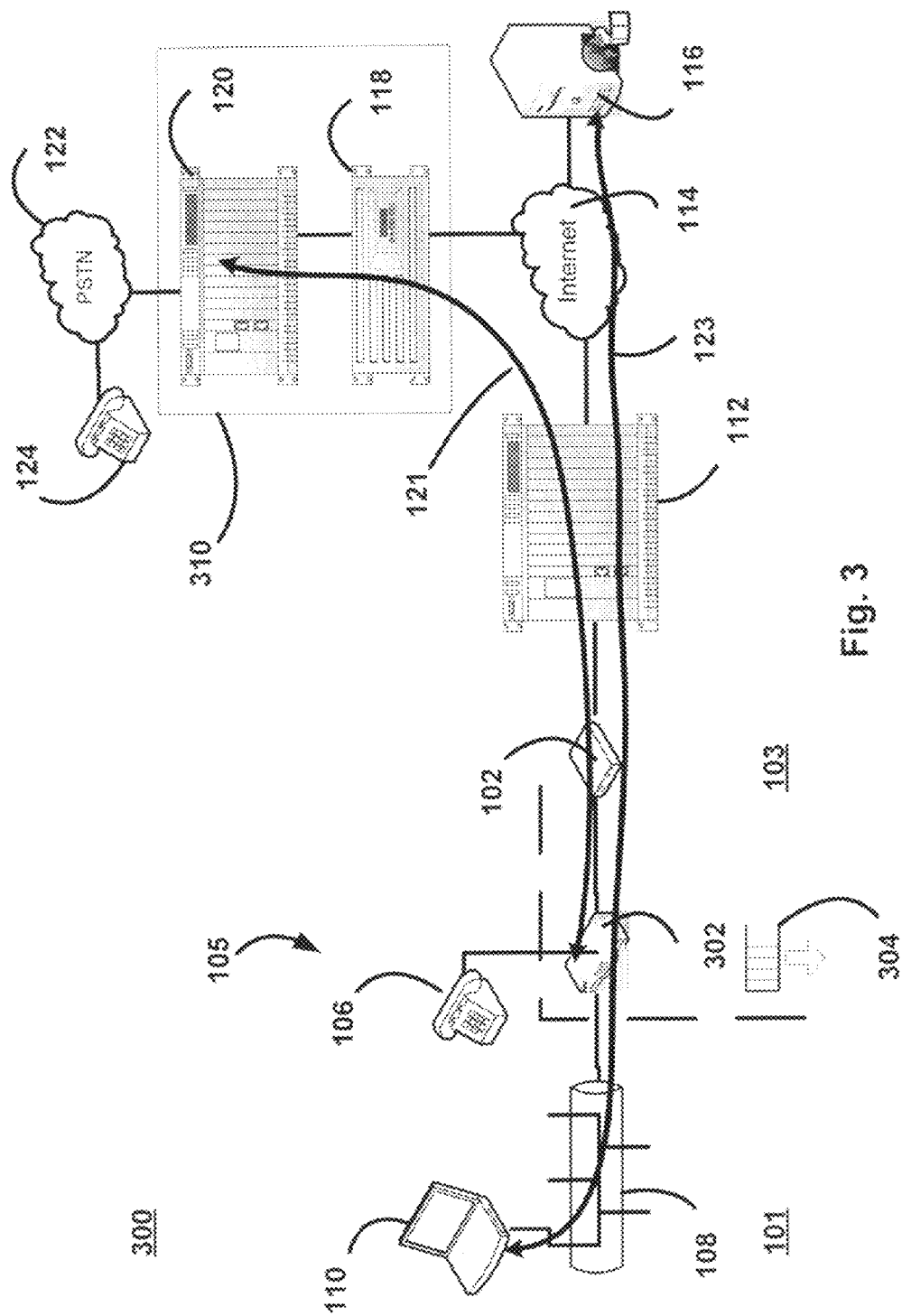
FIG. 3 is a system level diagram depicting a first embodiment of a data network that also functions, in part, as a telecommunication system based on VoIP in accordance with the subject invention.

FIG. 3 is a system level diagram depicting a first embodiment of a data network 300 that also functions, in part, as a telecommunication system based on VoIP in accordance with the subject invention. For sake of clarity, all components described above with respect to data network 100 are identical to those described in the subject data network 300 (and additional embodiments to follow) unless otherwise described herein. It is also noted that the telephony gateway(s) 120 and media relay(s) 118 comprises a larger VoIP telephony service provider 310 that also contains additional devices (i.e., servers and the like, not shown) to provide the necessary infrastructure and call processing capabilities to set up, execute and tear down VoIP communication sessions between broadband connected customers 105 as well as broadband connected customers 105 and PSTN equipment 124. The VoIP Service Provider 310 may be implemented using a plurality of computer systems and like type general and/or specific purpose devices and systems.

In this first embodiment of the invention, an improved telephone adapter (TA) 302 described in greater detail below replaces the prior TA 104. The voice traffic management method 200 described above is executed within the improved TA 302 such that the desired bandwidth control of non-voice-type traffic is achieved. Specifically, upon detection of a new voice communication, the improved TA 302 alters bandwidth settings at its LAN egress port such that only non-voice-type traffic 304 is queued and potentially dropped at the improved TA 302 rather than proceeding into the LAN portion 101 of the data network 300. Non-voice-type traffic 304 includes but is not limited to user application packet attempting to move through the LAN portion 101 as part of a download 123 from server 116 to a laptop device 110 on the customer network 105. By controlling the downstream rate to the laptop device 110, at the LAN egress port, non-voice-traffic is queued (and possibly dropped). This causes the TCP rate control to scale down the download rate to a point where packet drops are avoided at the CMTS 112.

Figure 4:
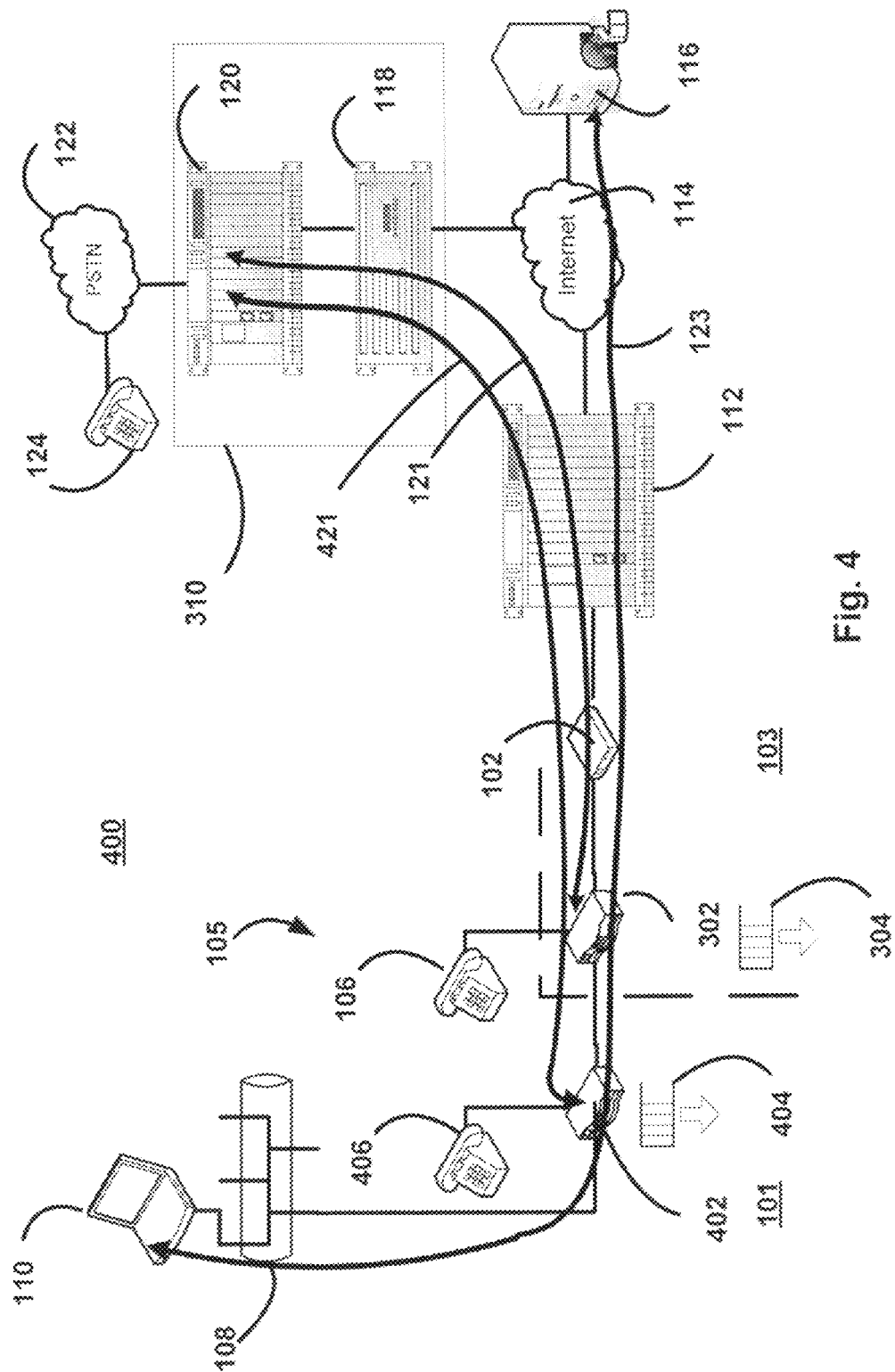
FIG. 4 is a system level diagram depicting a second embodiment of a data network that also functions, in part, as a telecommunication system based on VoIP in accordance with the subject invention.

FIG. 4 is a system level diagram depicting a second embodiment of a data network 400 that also functions, in part, as a telecommunication system based on VoIP in accordance with a second embodiment of the subject invention. Some customer environments 105 may include a first improved TA 302 and a second improved TA 402 connected in daisy-chain fashion, such as those having more than two VoIP lines. In this embodiment, the downstream QoS solution proposed in the first embodiment is enabled for both improved TAs 302 and 402. Specifically, when a voice communication session is not active on the first improved TA 302, it manages downstream traffic to the broadband link bandwidth and behaves like a pass-through. When a voice communication session 421 is active only on the second improved TA 402, it manages all downstream traffic to the LAN 101 similar to the single TA case (the first embodiment described above) such that only non-voice-type traffic 404 is queued and potentially dropped, ensuring that the voice packets destined for the second improved TA 402 are not dropped at the CMTS 112. When a voice communication session 121 is active only on the first improved TA 302, it manages all downstream traffic to the second improved TA 402 as described above ensuring that the voice packets destined for the first improved TA 302 are not dropped at the CMTS 112. When a voice communication session is active on both improved TA 302 and 402, both TA's manage downstream traffic. However, the first improved TA 302 "snoops" SIP & RTP traffic between the second improved TA 402 and the VoIP service provider 310 to determine which packets belong to the voice communication session. In one embodiment of the invention, the "snooping" entails identifying the beginning and end of a voice communication and allowing allowing RTP packets corresponding to the voice communication to bypass the bandwidth limitations at the LAN egress port. In another embodiment of the invention, all UDP packets are allowed to bypass the bandwidth limitations at the LAN egress port. The first improved TA 302 then bypasses the voice traffic from its LAN egress port, thereby ensuring that those packets are not queued or discarded. Since both TA 302 and TA 402 will actively monitor their local RTCP statistics, they will ensure that their respective actions throttle the user's application traffic 123 to the level necessary to maintain good voice quality for both voice communication sessions.

Figure 5:
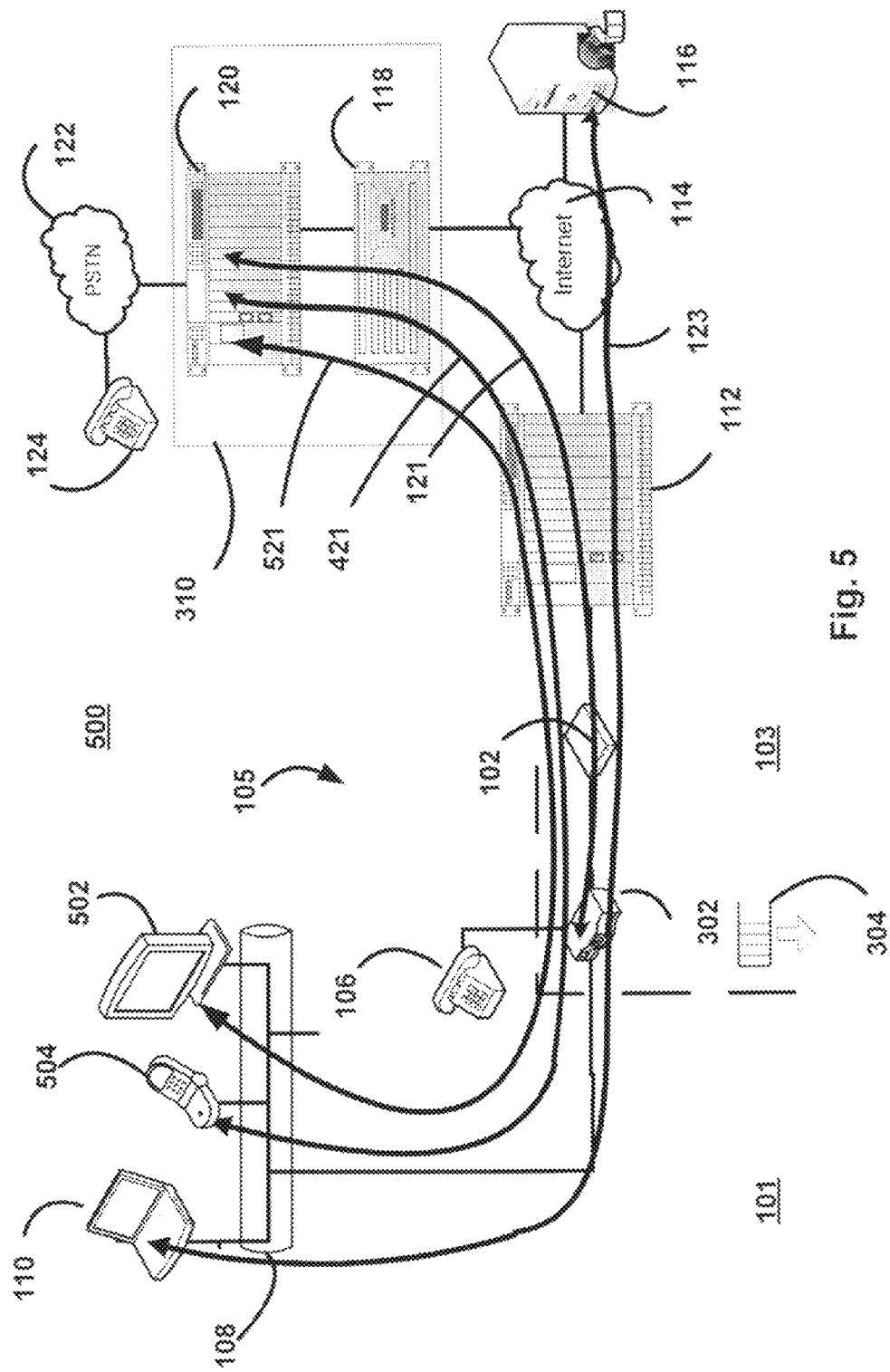
FIG. 5 is a system level diagram depicting a third embodiment of a data network that also functions, in part, as a telecommunication system based on VoIP in accordance with the subject invention.

FIG. 5 is a system level diagram depicting a third embodiment of a data network 500 that also functions, in part, as a telecommunication system based on VoIP in accordance with a third embodiment of the subject invention. In this embodiment, the customer network 105 has a WiFi phone 504 or a soft-phone 502 on the LAN 101 behind the improved TA 302. Conceptually, this embodiment is similar to the second embodiment with daisy-chained TAs 302 and 402. When a voice communication is not active on the improved TA 302, it does not shape downstream traffic to the broadband link bandwidth and behaves like a pass-through. When a voice communication 121 is active on the improved TA 302, it shapes all downstream traffic to the LAN 101 as described earlier ensuring that the voice packets destined for the improved TA 302 are not dropped at the CMTS 112. When a voice communication 521 is active on the soft-phone 502 on the LAN 101, the improved TA 302 "snoops" SIP & RTP traffic between the soft-phone 502 and the VoIP service provider 310 to determine which packets belong to voice traffic. The improved TA 302 then bypasses the voice traffic from the bandwidth limitations exercised at the LAN egress port, thereby ensuring that those packets are not queued or discarded 304 in the improved TA 302 as would be from other traffic such as download 123.

Figure 6:
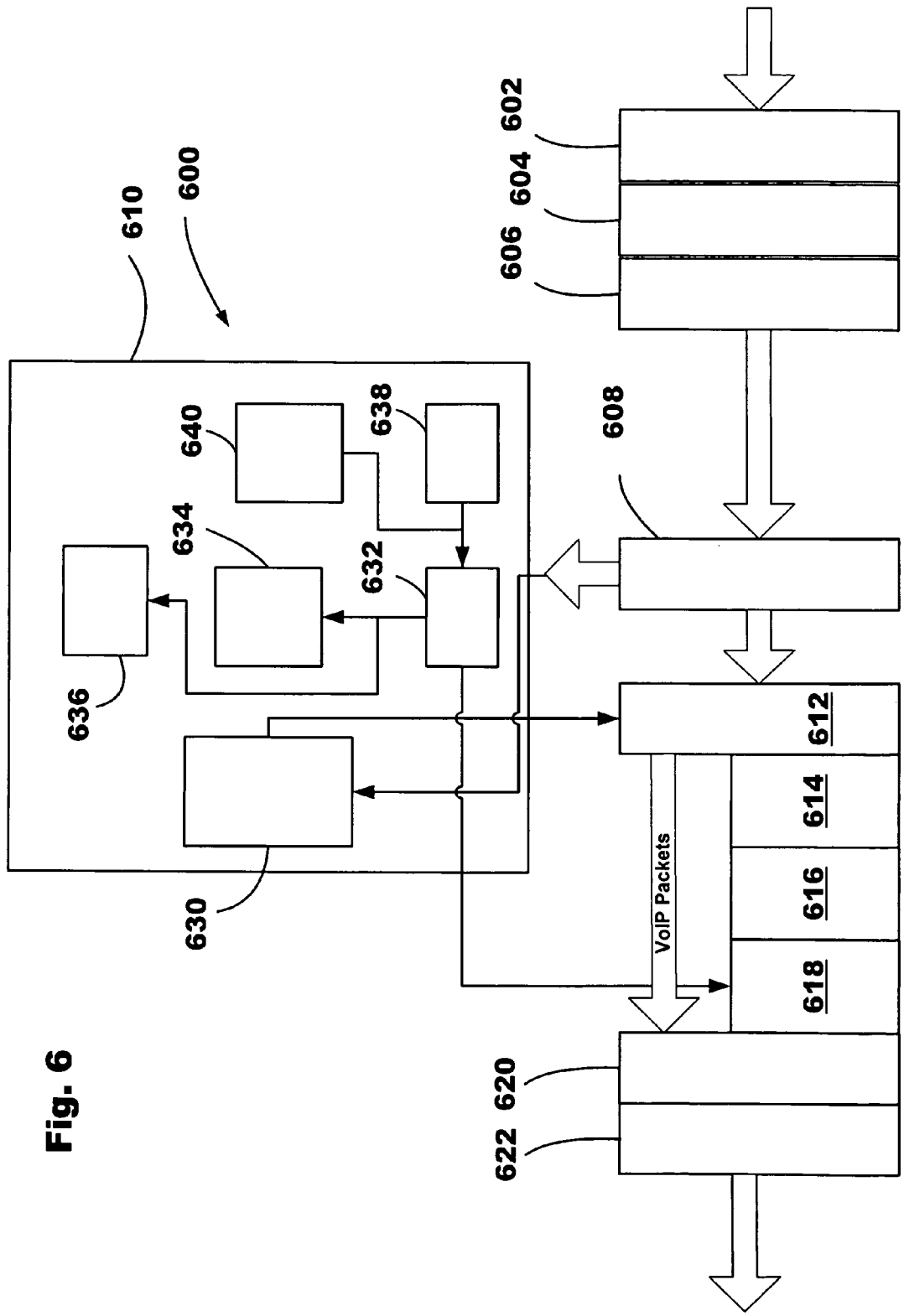
FIG. 6 is a block diagram of an apparatus for voice traffic management in a data network in accordance with the subject invention.

FIG. 6 is a block diagram of an improved TA 600 (also represented earlier as TA's 302 and 402) that operates in accordance with subject invention. The improved TA 600 comprises a plurality of networking protocol components that are linked to a traffic control manager 610 to achieve the desired results of LAN egress bandwidth management as described. Specifically, TA 600 includes WAN port hardware 602 adapted for receiving data network traffic conveyance media (i.e., RJ-45 cabling and the like) to define a WAN ingress port. Other types of media are possible and known to those skilled in the art. The WAN port hardware 602 is connected to a WAN driver 604 for facilitating IP stack management and data packet movement into the TA 600. The WAN driver 604 is connected to a firewall and network address translation (NAT) module 606 for performing basic firewall and addressing tasks for devices connected in the LAN 101 beyond the TA 600. The firewall and NAT module 606 is connected to a router 608 which performs basic data packet forwarding tasks to the appropriate device(s) in the LAN 101.

The router 608 is connected to a classifier 612 which identifies and orders (or queues) incoming data packets for distribution to the appropriate device(s) in the LAN 101. The classifier 612 includes a dynamic class which exists by default, called VoIP Service Provider Class that identifies downstream voice communication sessions based on header fields selected from the group consisting of: Source IP Address, Destination IP Address, Source IP Port, Destination IP Port, Protocol and TOS/DS-Byte field. In one embodiment of the invention, the classifier 612 supports a configurable number of entries for this class in order to support multiple voice communication sessions. These entries are automatically populated by the snooper function described below.

The classifier 612 is connected to a plurality of queues 614 which retain the data packets as organized by the classifier 612 for subsequent output to a LAN connected device. The plurality of queues 614 is connected to a scheduler 616 which maintains the chronological order of the data packets outputted from the plurality of queues 614. The scheduler 616 is connected to a traffic shaper 618 that adjusts the rate of egress traffic towards the LAN 110 to a specific bandwidth dependent upon traffic conditions. The bandwidth is controlled by the traffic control manager 610 as described below. The traffic shaper 618 is connected to a LAN driver 620 for facilitating IP stack management and data packet movement out of the TA 600. LAN driver 620 is connected to LAN port hardware 622 adapted for receiving data network traffic conveyance media (i.e., RJ-45 cabling and the like) to define a LAN egress port.

The router 608 is also connected to the traffic control manager 610 for the purposes of evaluating the type of traffic (e.g. voice-type and non-voice-type) moving through the TA 600 so that the appropriate traffic management actions can be taken in accordance with the subject invention such as but not limited to evaluating the quality of the voice-type traffic. Specifically, the traffic control manager 610 includes a voice-type traffic snooper 630 connected to the router 608. The snooper 630 evaluates voice-type traffic flowing between the LAN port 622 and WAN port 602 to identify which packets belong to VoIP provider voice communication session(s). These include SIP, RTP, RTCP and VoIP provider DNS packets. In one embodiment of the invention, examination of the SDP fields determines which RTP sessions belong to VoIP provider voice communication session(s). The snooper 630 controls the addition (when a new VoIP provider voice communication session is identified) deletion (when an existing VoIP provider voice communication session is closed) of entries in the classifier 612 and assigns them to a VoIP service provider class so that such sessions are not limited by the actions and characteristics of the queues 614, scheduler 616 and traffic shaper 618.

Traffic control manager 610 further includes a plurality of LAN egress control modules that assist in executing the bandwidth monitoring and control functionality described in the method above. Specifically, a LAN egress manager module 632 dynamically controls the shaper's bandwidth. The LAN egress manager module 632 is connected to a LAN egress manager statistics module 634 which maintains network traffic statistics, a LAN egress manager logs module 636 which maintains logs based on the collected statistics, a LAN egress manager configuration module 640 and an RTCP Statistics module 638.

The LAN Egress Manager 632 continuously monitors the queues 614, which would initially fill up when the shaper is enabled 618, and slowly drop down when the TCP rate control kicks in. When an average queue utilization drops below a value defined by a Queue Threshold Factor, the LAN Egress Manager 632 checks to see if a Shaper Ramp-up Timer has expired, and if a packet Fraction Lost, Fraction Discarded, Round-trip Delay and Listening MOS are all below their respective thresholds. If so, the shaper 618 is ramped up by adding a Linear Shaper Ramp-up Bandwidth Adder value to the current shaper bandwidth value. The LAN Egress Manager 632 waits for the Shaper Ramp-up Timer to expire again, and then checks the packet Fraction Lost, Fraction Discarded, Round-trip Delay and Listening MOS. The calculation is done using cumulative metrics taken from when the last ramp-up occured. If all of them are meet their respective thresholds, it ramps up the shaper bandwidth value again. This process continues until one of the above goes above its threshold. The shaper bandwidth value at that point is stored as the Shaper Maximum Bandwidth (i.e, the first value described above with respect to the method 200).

Once the packet Fraction Lost, Fraction Discarded, Round-trip Delay or Listening MOS goes above its threshold, indicating loss of voice quality, the shaper 618 is ramped down to a value given by (current shaper value*Exponential Shaper Ramp-down Factor). After the Shaper Ramp-down Timer expires, the voice quality metrics are checked again. If any of them are still above their respective thresholds, the ramp-down process is repeated.

Once the voice quality metrics are all below their thresholds, the ramp-up process starts again, but this time it ramps only up to a value given by (Shaper Maximum Bandwidth−Shaper Equilibrium Differential). This value is now re-designated as the new Shaper Maximum Bandwidth (i.e., the second value with respect to the method 200 described above) for the next ramp-down/ramp-up cycle. If none of the voice quality thresholds are crossed when the shaper 618 is at the new Shaper Maximum Bandwidth, then it has converged (reached equilibrium). The Shaper Maximum Bandwidth at the end of the call is stored in memory as Previous Call Shaper Maximum Bandwidth if the equilibrium was achieved in the call, else this value is not updated. When all calls to the device end, the shaper 618 is set to the broadband link bandwidth as described in point earlier. For subsequent voice calls, at the beginning of the call the shaper 618 is started at a value given by (Previous Call Shaper Maximum Bandwidth*Exponential Shaper Ramp-down Factor) or Initial Shaper Bandwidth, whichever is larger.

Figure 7:
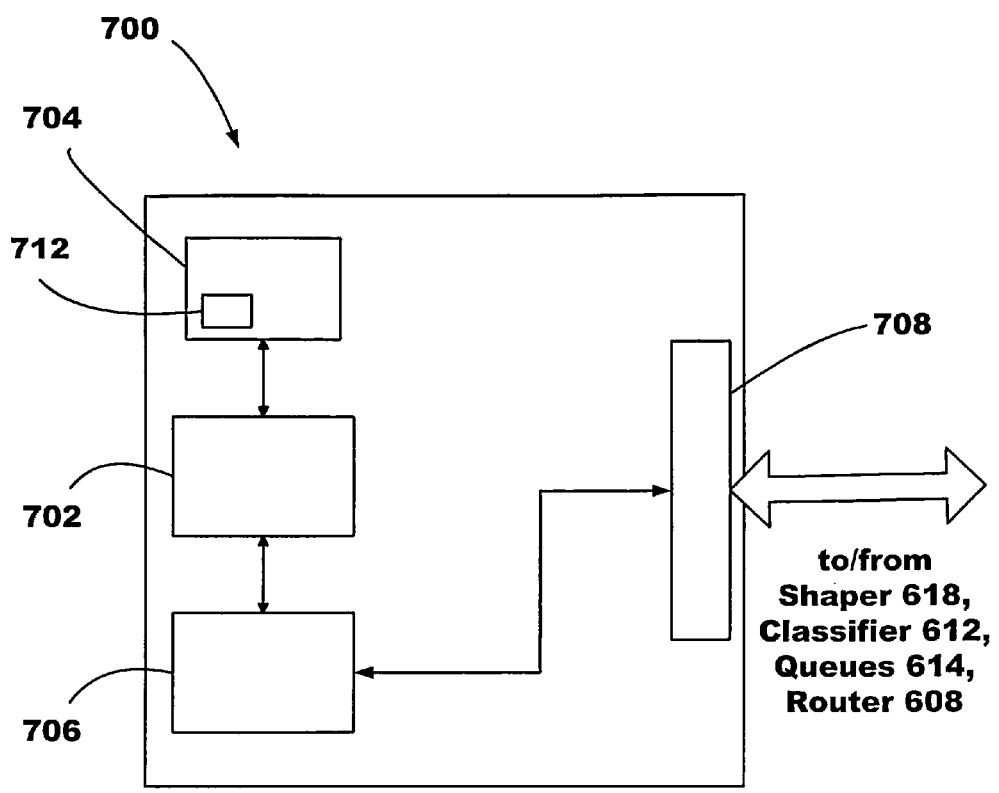
FIG. 7 depicts a schematic diagram of a controller that may be used to practice one or more embodiments of the present invention.

FIG. 7 depicts a schematic diagram of a controller 700 that may be used to practice the present invention. The controller 700 may be one of any form of a general purpose computer processor used in an IP-based network such as a corporate intranet, the Internet or the like. The controller 700 comprises a central processing unit (CPU) 702, a memory 704, and support circuits 706 for the CPU 702. The controller 700 also includes provisions 708 for connecting the controller 700 to TA components that are controlled by for example the voice traffic manager 610. Additionally, the controller 700 and its operating components and programming as described in detail below are shown as a single entity; however, the controller may also be one or more controllers and programming modules interspersed around the voice traffic manager 610 each carrying out a specific or dedicated portion of the network traffic management as described earlier. By way of non-limiting example, a portion of the controller 700 or software operations may occur at the snooper module 630 and another portion of the controller 700 or software operations may occur at the LAN Egress Management Module 632. Other configurations of the controller and controller programming are known and understood by those skilled in the art.

The memory 704 is coupled to the CPU 702. The memory 704, or computer-readable medium, may be one or more of readily available memory such as random access memory (RAM), read only memory (ROM), floppy disk, hard disk, flash memory or any other form of digital storage, local or remote. The support circuits 706 are coupled to the CPU 702 for supporting the processor in a conventional manner. These circuits include cache, power supplies, clock circuits, input/output circuitry and subsystems, and the like. A software routine 712, when executed by the CPU 702, causes the controller 700 to perform processes of the present invention and is generally stored in the memory 704. The software routine 712 may also be stored and/or executed by a second CPU (not shown) that is remotely located from the hardware being controlled by the CPU 702.

The software routine 712 is executed when the disclosed method of processing group call requests is desired. The software routine 712, when executed by the CPU 702, transforms the general purpose computer into a specific purpose computer (controller) 700 that controls the various servers TA components/modules in the manner described above to achieve the network traffic management desired. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 712 of the present invention is capable of being executed on computer operating systems including but not limited to Microsoft Windows 98, Microsoft Windows XP, Apple OS X, eCOS and LINUX. Similarly, the software routine 712 of the present invention is capable of being performed using CPU architectures including but not limited to Apple Power PC, Intel x86, Sun service provider agentRC, MIPS and Intel ARM.

Note that while the embodiments described above are with respect to the monitoring of bandwidth to improve voice communications sessions over data network, these are not the only types of sessions that can benefit from the present invention. In general, any other real time communication (e.g. video) that can benefit from downstream QoS management are contemplated in the subject invention. The enhanced TA 302/402 as described can support selective bandwidth limitation in accordance with the invention for media streams other than VoIP? For example, instead of "snooping" for SIP and RTP protocols to identify voice vs. non-voice traffic, it can snoop for the protocol corresponding to the media stream in question (for example RTSP), and apply selective limiting to all other downstream traffic. This snoop based differentiation can apply to multiple such media streams (similar to multiple voice streams presented earlier). The multiple streams (whether they be voice, video or other desired downstream activity) could take several forms, including: a second (or third/fourth/etc) independent calls from either TA 302 or 402, a second leg of an existing call (a 3-way call), putting an existing call on hold (which generally drops the voice stream in one or both directions), or even a change in the voice media type (and therefore bandwidth utilization) of an existing call. Most such multiple streams will be preceded by some SIP signaling, but not always in the case of the voice media type changing.

While foregoing is directed to embodiments of the present invention, other and further embodiments of the invention may be devised without departing from the basic scope thereof, and the scope thereof.

What is claimed is:

1. Method of voice traffic management in a data network, the data network functioning, in part, as a telecommunication system based on Voice over Internet Protocol (VoIP) and having a wide area network (WAN) portion and a local area network (LAN) portion, the method comprising the steps of:
    (a) establishing a default overall maximum bandwidth setting for all data traffic at a LAN egress port of a device that provides WAN access to LAN network components when voice-type traffic is not present in the LAN portion of the data network;
    (b) detecting voice-type traffic in the LAN portion of the data network;
    (c) reducing overall maximum bandwidth setting for all data traffic at the LAN egress port to effect a change in a rate of non voice type traffic entering the LAN portion of the data network;
    (d) monitoring non voice type traffic and voice quality statistics to determine if the rate of non voice type traffic entering the LAN portion of the data network has changed;
    (e) performing a linear increase of the overall maximum bandwidth setting at the LAN egress port to a first value while monitoring voice quality statistics;
    (f) determining if voice quality has degraded during increase of the overall maximum bandwidth setting; and
    (g) repeating steps (e) and (f) if voice quality has not degraded.

2. The method of claim 1 wherein, during step (g), the overall maximum bandwidth setting at the LAN egress port is set to a second value that is less than the first value.

3. The method of claim 2 further comprising the steps of:
    (h) upon detection of termination of the voice-type traffic in the LAN portion of the data network, setting the overall maximum bandwidth setting to the default maximum value; and
    (i) upon detection of new voice-type traffic in the LAN portion of the data network, setting the overall maximum bandwidth setting to a fraction of the second value.

4. The method of claim 3 wherein the fraction of the second value is approximately 70%.

5. The method of claim 3 wherein the maximum value is determined by one selected from the group consisting of a measurement of downstream bandwidth of the broadband link associated with the data network and a sum of the second value and bandwidth used by the voice-type traffic.

6. The method of claim 1 wherein the detection of voice-type traffic in the LAN portion of the data network is achieved by one selected from the group consisting of determining completion of SIP/SDP codec negotiation and determining the sending or receiving of a SIP INVITE message associated with the voice-type traffic in the LAN portion of the data network.

7. The method of claim 1 wherein reducing the overall maximum bandwidth setting at the LAN egress port from its default setting further comprises reducing said overall maximum bandwidth setting to approximately 150 Kbs.

8. The method of claim 1 wherein voice traffic bypasses the overall maximum bandwidth setting such that traffic is only reduced with respect to non-voice type traffic in the LAN portion of the data network that effects voice quality.

9. The method of claim 3 wherein steps (a)-(i) are performed two or more times consecutively to account for two or more instances of new voice-type traffic in the LAN portion of the data network.

10. The method of claim 1 wherein step (e) is performed upon achieving a desired non-voice type traffic rate.

11. A non-transitory computer readable medium having stored thereon instructions that when executed by a processor cause the processor to perform a method of voice traffic management in a data network, the data network functioning, in part, as a telecommunication system based on Voice over Internet Protocol (VoIP) and having a wide area network (WAN) portion and a local area network (LAN) portion, the method comprising the steps of:
    (a) establishing a default overall maximum bandwidth setting for all data traffic at a LAN egress port of a device that provides WAN access to LAN network components when voice-type traffic is not present in the LAN portion of the data network;

(b) detecting voice-type traffic in the LAN portion of the data network;

(c) reducing overall maximum bandwidth setting for all data traffic at the LAN egress port to effect a change in a rate of non voice type traffic entering the LAN portion of the data network;

(d) monitoring non voice type traffic and voice quality statistics to determine if the rate of non voice type traffic entering the LAN portion of the data network has changed;

(e) performing a linear increase of the overall maximum bandwidth setting at the LAN egress port to a first value while monitoring voice quality statistics;

(f) determining if voice quality has degraded during increase of the overall maximum bandwidth setting; and (g) repeating steps (e) and (f) if voice quality has not degraded.

12. The non-transitory computer readable medium of claim 11 wherein, during step (g), the overall maximum bandwidth setting at the LAN egress port is set to a second value that is less than the first value.

13. The non-transitory computer readable medium of claim 12, wherein the method further comprises the steps of:

(h) upon detection of termination of the voice-type traffic in the LAN portion of the data network, setting the overall maximum bandwidth setting to the default maximum value; and (i) upon detection of new voice-type traffic in the LAN portion of the data network, setting the overall maximum bandwidth setting to a fraction of the second value.

14. The non-transitory computer readable medium of claim 13 wherein the fraction of the second value is approximately 70%.

15. The non-transitory computer readable medium of claim 13 wherein the maximum value is determined by one selected from the group consisting of a measurement of downstream bandwidth of the broadband link associated with the data network and a sum of the second value and bandwidth used by the voice-type traffic.

16. The non-transitory computer readable medium of claim 11 wherein the detection of voice-type traffic in the LAN portion of the data network is achieved by one selected from the group consisting of determining completion of SIP/SDP codec negotiation and determining the sending or receiving of a SIP INVITE message associated with the voice-type traffic in the LAN portion of the data network.

17. The non-transitory computer readable medium of claim 11 wherein reducing the bandwidth setting at the LAN egress port from its default setting further comprises reducing said overall maximum bandwidth setting to approximately 150Kbs.

18. The non-transitory computer readable medium of claim 11 wherein voice traffic bypasses the overall maximum bandwidth setting such that traffic is only reduced with respect to non-voice type traffic in the LAN portion of the data network that effects voice quality.

19. The non-transitory computer readable medium of claim 13 wherein steps (a)-(i) are performed two or more times consecutively to account for two or more instances of new voice-type traffic in the LAN portion of the data network.

20. The non-transitory computer readable medium of claim 11 wherein step (e) is performed upon achieving a desired non-voice type traffic rate.

21. The method of claim 1, wherein the device that provides WAN access to LAN network components is a VoIP telephony adaptor (TA).

22. The non-transitory computer readable medium of claim 13, wherein the device that provides WAN access to LAN network components is a VoIP telephony adaptor (TA).

* * * * *